United States Patent [19]
Wreede

[11] Patent Number: 5,471,328
[45] Date of Patent: Nov. 28, 1995

[54] SEGMENTED IMAGE HOLOGRAPHIC DISKS

[75] Inventor: John E. Wreede, Azusa, Calif.

[73] Assignee: Hughes Aircraft Company, Los Angeles, Calif.

[21] Appl. No.: 96,586

[22] Filed: Jul. 23, 1993

[51] Int. Cl.[6] .............................. G02B 27/00; G03H 1/28
[52] U.S. Cl. .................................. 359/22; 359/24; 359/3; 359/32
[58] Field of Search .................................. 359/22, 23, 24, 359/3, 9, 15, 24, 32; 369/103

[56] References Cited

U.S. PATENT DOCUMENTS

| | | | |
|---|---|---|---|
| 3,695,744 | 10/1972 | Clay | 359/24 |
| 4,021,606 | 5/1977 | Takeda et al. | 369/103 |
| 5,282,066 | 1/1994 | Yu et al. | 359/22 |
| 5,327,266 | 7/1994 | Mulder et al. | 359/24 |

*Primary Examiner*—Paul M. Dzierzynski
*Assistant Examiner*—Audrey Chang
*Attorney, Agent, or Firm*—Leonard A. Alkov; W. K. Denson-Low

[57] ABSTRACT

A hologram structure including a plurality of holograms having substantially identical reconstruction characteristics disposed on a substrate for rotation about a rotation axis and containing segments of a composite image. The holograms are angularly offset relative to each other about a rotation axis such that the composite image is visible over at least one narrow solid angular region pursuant to rotation of the holograms about the rotation axis and illumination of the holograms with a reconstruction beam.

6 Claims, 4 Drawing Sheets

5,471,328

SEGMENTED IMAGE HOLOGRAPHIC DISKS

BACKGROUND OF THE INVENTION

The disclosed invention is directed generally to rotatable holographic structures that convey information, and is directed more particularly to a holographic structure that forms a complete composite image only when rotated at a sufficiently high rate.

Rotatable holographic structures are useful in displaying logos, trademarks, and the like on products that rotate as well as on advertising displays that include rotating elements. For example, rotatable holographic structures can be utilized on digital compact discs, phonograph records, automobile wheels and hubcaps, and other devices having visible rotating elements.

A known rotatable holographic structure includes a plurality of identical holograms that are rotationally offset relative to each other, such that a stationary image is formed when the hologram structure is rotated at an appropriate rotational speed. A consideration with such holographic structure, however, is that the holographic image is also viewable when the holographic structure is stationary, which reduces the impact of seeing the holographic image when the holographic structure is rotating.

SUMMARY OF THE INVENTION

It would therefore be an advantage to provide a rotatable holographic structure that produces a viewable complete composite image only when it is rotating at an appropriate rate.

The foregoing and other advantages are provided by the invention in a holographic structure that includes a plurality of holograms having substantially identical reconstruction characteristics disposed on a substrate for rotation about a rotation axis, each hologram containing segments of a composite image and being rotationally offset relative to each other such that the composite image is visible pursuant to rotation of the holograms about the rotation axis and illumination of the holograms with a reconstruction beam wherein the composite image is comprised of a superposition of the image segments.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
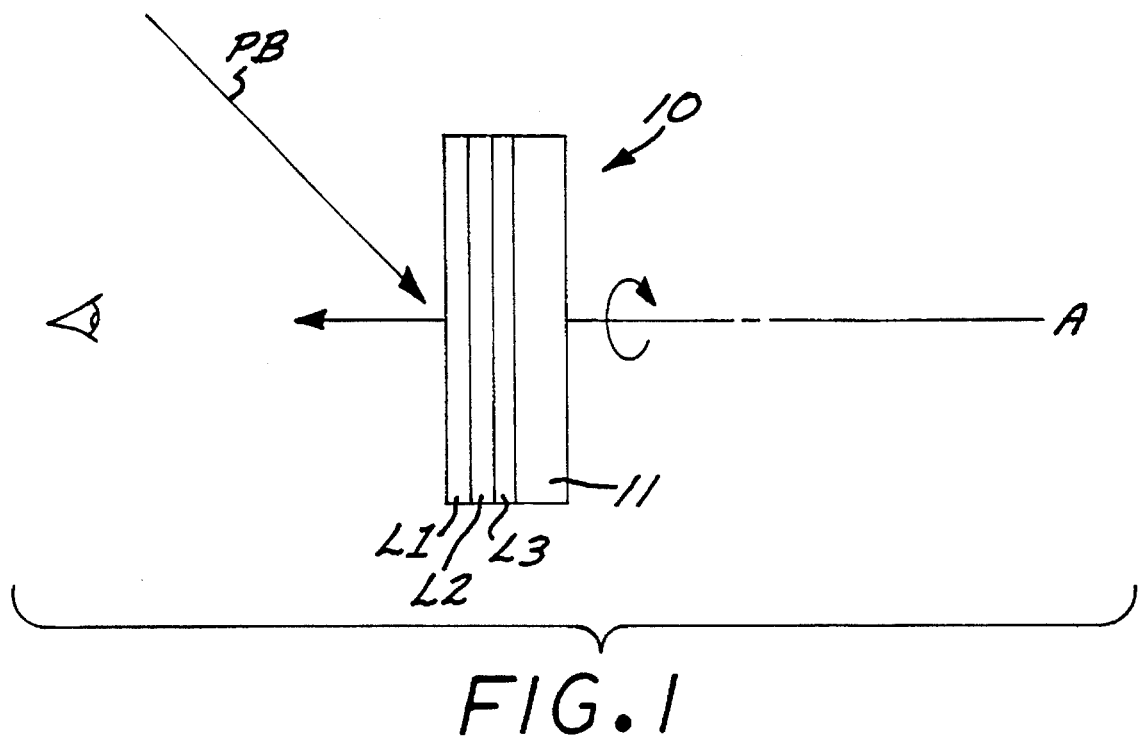
FIG. 1 is a schematic sectional view illustrating an illustrative example of a rotatable holographic structure in accordance with the invention.

In the following detailed description and in the several figures of the drawing, like elements are identified with like reference numerals.

Referring now to FIG. 1, set forth therein is an elevational view of a rotatable holographic structure 10 in accordance with the invention which includes a plurality of stacked hologram layers L1, L2, L3 laminated together onto a substrate 11 to form a unitary structure. Each holographic layer L1, L2, L3 contains different respective holograms recorded therein, and the holographic structure 10 produces a viewable composite image pursuant to rotation of the structure about a central axis A and illumination thereof with a reconstruction beam PB. By way of illustrative example, each of the hologram layers contains a reflection hologram.

Figure 2:
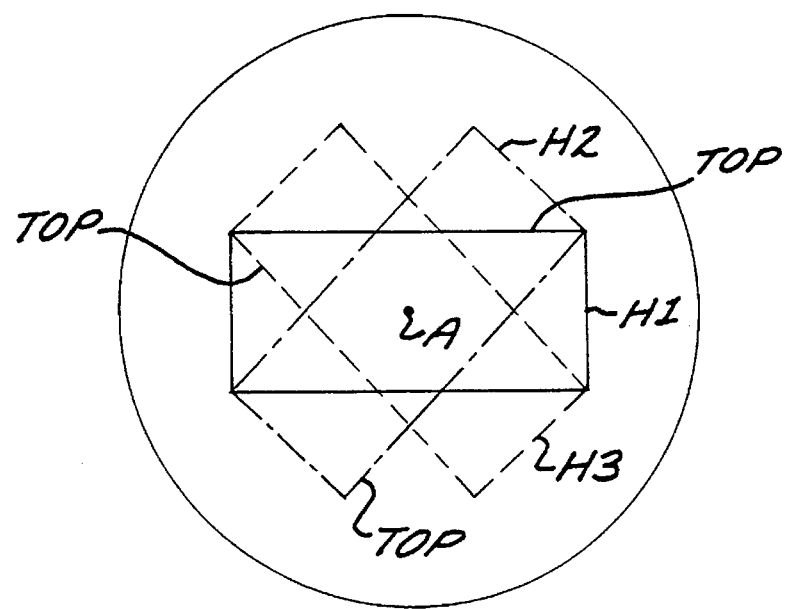
FIG. 2 is a front elevational view of the rotatable holographic structure of FIG. 1.

Referring now to FIG. 2, set forth therein is a schematic front elevational view illustrating the relationship of the holograms H1, H2, H3 recorded in the hologram layers L1, L2, L3. In accordance with the invention, each of the holograms H1, H2, H3 contains a segment or portion of a composite image and is of an appropriate spectral bandwidth that produces a good viewable image. The spectral bandwidth of each of the holograms H1, H2, H3 can be for the same range of wavelengths or different ranges of wavelengths, such that the holograms produce the same color or assorted colors. Each hologram of a particular color is particularly recorded so as to be identically reconstructible as to reconstruction beam angle, and all holograms are recorded so as to be identically reconstructible as to viewing angle. In particular, each hologram of a particular color is recorded so as to be reconstructible over the same narrow solid reconstruction beam angle set, wherein a narrow solid reconstruction beam angle set includes one or more narrow solid beam angles as determined by the number of reference beams utilized to construct each hologram, and all holograms are recorded so as to viewable over the same narrow solid viewing angle set or eyebox set, wherein an eyebox set includes one or more eyeboxes as determined by the number of object beams.

Thus, each hologram produces an image of a predetermined color that is viewable from an eyebox set that is the same for all of the holograms, wherein the respective colors of the holograms can be the same or assorted. To the extent that the holograms produce assorted colors, the reconstruction beams for the respective colors could be separate or a composite reconstruction beam containing the appropriate colors could be utilized. The image segments are oriented similarly in all holograms such that the respective image segments reconstructed by a reconstruction beam are oriented similarly when viewed from the corresponding eyebox set, while each hologram is oriented at a different angular position about the central axis A such that for a predetermined reconstruction beam only one hologram produces an image that is viewable from the corresponding eyebox set at any given angular position of the hologram structure. In particular, each hologram can be considered as having a top boundary as indicated on FIG. 2, and for a given reconstruction beam, each hologram produces an image that is viewable from the corresponding eyebox set only when its top boundary is at a particular angular position about the central axis. Thus, for the specific example of a reconstruction beam configured such that a hologram in the hologram structure produces an image that is viewable from the corresponding eyebox set only when the top boundary of the hologram is at the top of the hologram structure, a hologram will produce an image that is viewable from the predetermined eyebox set only when its top boundary is at the top of the hologram structure as illustrated in FIG. 2 as to the hologram H1.

In accordance with the invention, the holograms of the hologram structure contain segments of the composite image, wherein the image segments can be mutually exclusive (i.e., each hologram contains a different portion of the composite image), or the image segments can be overlapping such that one or more subsegments of the composite image are common to a plurality of the image segments and thus contained in a plurality of the holograms of the hologram structure.

When the hologram structure is rotated about the central axis at a sufficiently high rate and a reconstruction beam illuminates the hologram structure, each hologram in sequence will be viewable from the corresponding eyebox set when it is properly oriented at the angular position appropriate for the particular reconstruction beam, and all segments will be perceived by the viewer at an eyebox of the corresponding eyebox set as a result of vision persistence and the superposition of the different image segments of the holograms H1, H2, H3. Effectively, each hologram comprises a frame of a series of frames that are sequentially viewable from each of the eyeboxes of the eyebox set associated with a particular reconstruction beam. If a plurality of reconstruction beams illuminate the rotating holograms, the composite image will be viewable from a plurality of eyebox sets respectively associated with the respective reconstruction beams. When the hologram structure is stationary, only the hologram that is in proper position for reconstruction will be viewable for the case of a single reconstruction beam. For a plurality of different reconstruction beams, different holograms may be viewable from the respective eyebox sets when the hologram structure is stationary.

In an implementation of the hologram structure wherein the holograms contain mutually exclusive segments of the composite image and at least two of the holograms produce different colors, the mutually exclusive segments of the composite image will be of the colors produced by the holograms that produce the respective image segments. In an implementation wherein the holograms contain segments include contain at least one subsegment that is common to a plurality of segments, and the holograms that contain a common or overlapping subsegment produce different colors, the non-overlapping portions of the segments will be of the colors produced by the holograms that produce the respective non-overlapping portions, while each overlapping subsegment will be of the color produced the combination of the colors produced by the holograms that contain the overlapping subsegments. Thus, for example, if an overlapping subsegment is contained in a red hologram and a blue hologram the overlapping subsegment will appear as magenta in the composite image.

Figure 3A:
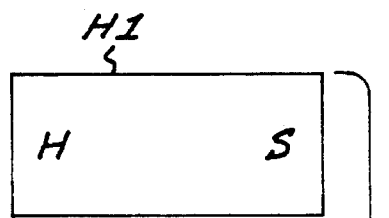
FIGS. 3A, 3B, and 3C are respective front elevational views of illustrative examples of respective image segments recorded in respective holograms of the rotatable holographic structure of FIG. 1.
Figure 3B:
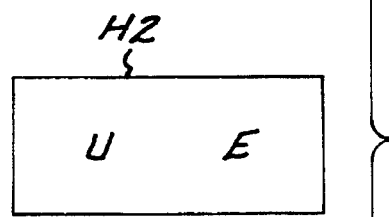
Figure 3C:
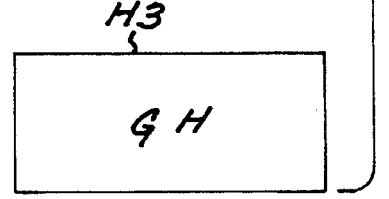
Figure 4:
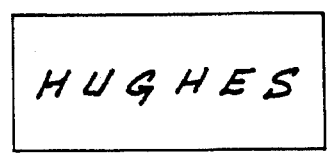
FIG. 4 is a respective front elevational view schematically depicting the composite image produced in accordance with invention by the image segments of FIGS. 3A, 3B, and 3C.

Referring now to FIGS. 3A–3C, set forth therein by way of simplified example are respective mutually exclusive image segments for the holograms H1, H2, H3 which if superimposed would form a composite image comprised of the term HUGHES as shown in FIG. 4. The first hologram H1 contains the letters H and S at the appropriate locations for the composite image; the second hologram H2 contains the letters U and E at the appropriate locations for the composite image; and the third hologram H3 contains the letters G and H at the appropriate locations for the composite image. For symmetry, the holograms H1, H2, H3 of FIGS. 3A–3C would be rotationally positioned at a spacing of 120 degrees, for example. The holograms of FIGS. 3A–3C can be of the same-color, or they can be of assorted colors (e.g., red, blue and green; red, red, and blue; and so forth).

Figure 5:
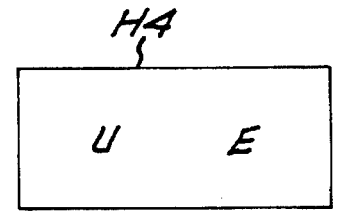
FIG. 5 is a front elevational view of an image segment recorded in a hologram which together with the holograms containing the image segments of FIGS. 3A, 3B, and 3C form a hologram structure in accordance with the invention which produces a composite image that contains an area whose color is based on the combination of the colors of the holograms containing the image segments of FIGS. 3B and 5.

Referring now to FIG. 5, schematically depicted therein is a front elevational view of an image segment recorded in a hologram H4 which together with the holograms containing the image segments of FIGS. 3A, 3B, and 3C form a hologram structure in accordance with the invention which produces a composite image that contains an area whose color is based on the combination of the colors of the holograms containing the image segments of FIGS. 3B and 5. In particular, if the holograms containing the image segments of FIGS. 3B and 5 produce different colors, then the color of "U" and the second "H" of the composite image "HUGHES" would be the color that results from combining the respective colors of the holograms containing the image segments of FIGS. 3B and 5. For symmetry, the holograms H1, H2, H3 of FIGS. 3A–3C and the hologram H4 of FIG. 5 would be rotationally positioned at a spacing of 90 degrees, for example.

While the foregoing illustrative example of a holographic structure in accordance with the invention has been directed to the use separate hologram layers for each hologram, it should be appreciated that the plurality of holograms can be recorded in a single layer. It should be further appreciated that the holograms do not need to be centered on the rotation axis, so long as each hologram is configured to be at the same orientation when visible. It should also be appreciated that the plurality of holograms can be laterally adjacent hologram layers such as a plurality of pie-section shaped hologram layers that together form a circular hologram structure.

The individual holograms of the rotatable holographic structure of the invention are made pursuant to holographic exposure that defines the color, reconstruction angle and the viewer's eyebox for a given recording material and processing. For the particular example wherein the composite image comprises 2-dimensional symbols such as alphanumeric characters, each of the holograms can be formed by first masking and pre-exposing a holographic recording layer to incoherent light to desensitize the areas of the holographic recording layer that form the background of the desired symbols. In other words, a mask having opaque areas in the form of the desired symbols is applied to the holographic recording layer which is then exposed to incoherent illumination. Masking during such pre-exposure protects areas in the holographic recording layer that are in the shape of the desired symbols such that a hologram can be later formed in such protected areas. The pre-exposed holographic recording layer is then subjected to hologram forming exposure, and a hologram is formed only in those areas that were protected and thus not subjected to incoherent illumination. Alternatively, the holographic recording layer could be cut to the shape of the desired symbols before or after holographic exposure, or the holographic recording layer could be masked during holographic exposure by a mask disposed on the holographic recording layer, for example.

Figure 6:
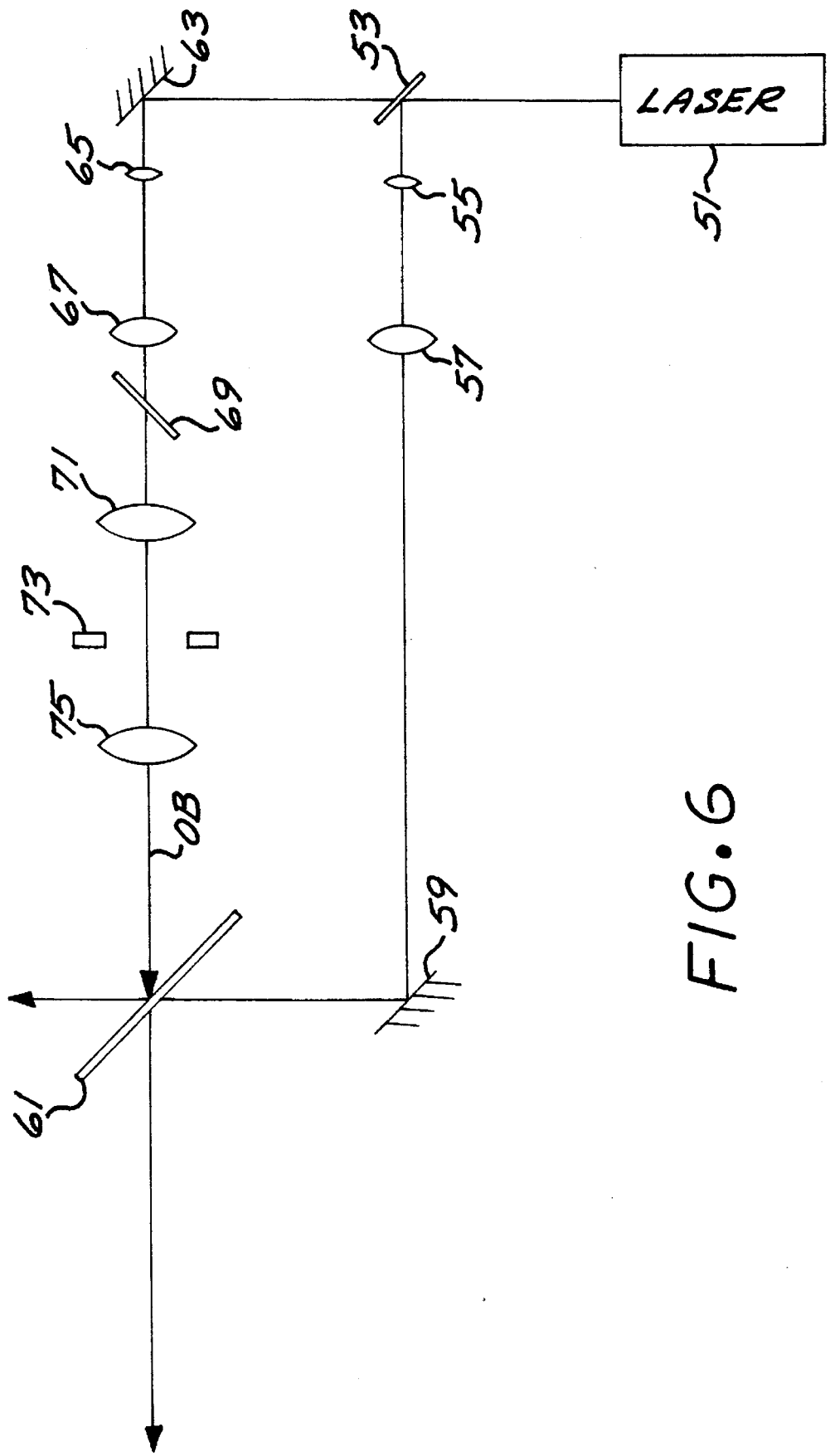
FIG. 6 schematically illustrates an exposure system for constructing each of the reflection holograms of the rotatable holographic structure of FIG. 1.

Referring now to FIG. 6, set forth therein is an example of an exposure system for holographically exposing a holographic recording layer 61 which has been exposed to define hologram recording areas in the shape of desired symbols such as alphanumeric characters. The exposure system includes a laser 51 whose output is directed to a beamsplitter 53 which provides a reflected output and a transmitted output. The reflected output of the beam-splitter 53 is provided to a spatial filter 55 which produces a diverging beam that is provided to a double convex lens 57. The output of the double convex lens 57 is directed a light bending mirror 59 whose reflected output comprises a reference beam RB that is incident on the pre-exposed holographic recording layer 61.

The transmitted output of the beamsplitter 53 is directed by a light bending mirror 63 to a spatial filter 65 which produces a diverging output that is provided to a collimating lens 67. The output of the collimating lens 67 is provided to a diffuser 69 whose diffuse output is provided to a first double convex spherical imaging lens 71. The output of the imaging lens 71 is directed to an aperture 73 whose position and size defines the solid angle over which the resulting hologram will be visible. The output of the aperture 73 is provided to a second double convex spherical imaging lens 75. The output of the imaging lens 75 comprises an object beam that is incident on the holographic recording layer 61.

The focal lengths of the first and second imaging lenses 71, 75 and the locations of the diffuser 69, the aperture 73 and the holographic recording layer 61 are configured so that the image of the diffuser 69 is located substantially at the holographic recording layer 61, while the image of the eyebox defining aperture is located several feet away from the object beam exit side of the holographic recording layer 61.

The particular object beam angle and reference beam angle utilized will depend on the desired reconstruction angle, viewing angle, and color of reconstruction. Accordingly, for a selected reconstruction beam angle and viewing angle combination, construction for different colors of reconstruction requires changes in the laser wavelength or changes in both object beam angle and reference beam angle.

While the foregoing has been directed to the particular example wherein a holographic recording layer is masked and pre-exposed to define the shape of the hologram, it should be appreciated that the desired shaping of the hologram can be achieved by a mask disposed on the holographic recording layer or by a mask at the diffuser 69. When a mask is located at the diffuser 69, the image of the mask and the diffuser should be at the plane of the holographic recording layer.

To the extent that multiple eyeboxes are desired, it should be appreciated that multiple eyeboxes can be provided by addition of further object beams, for example in accordance with conventional techniques.

It should also be appreciated that image segments of a 3-dimensional object can be produced by masking in accordance with conventional techniques, or by isolating individual parts of the 3-dimensional object.

Figure 7:
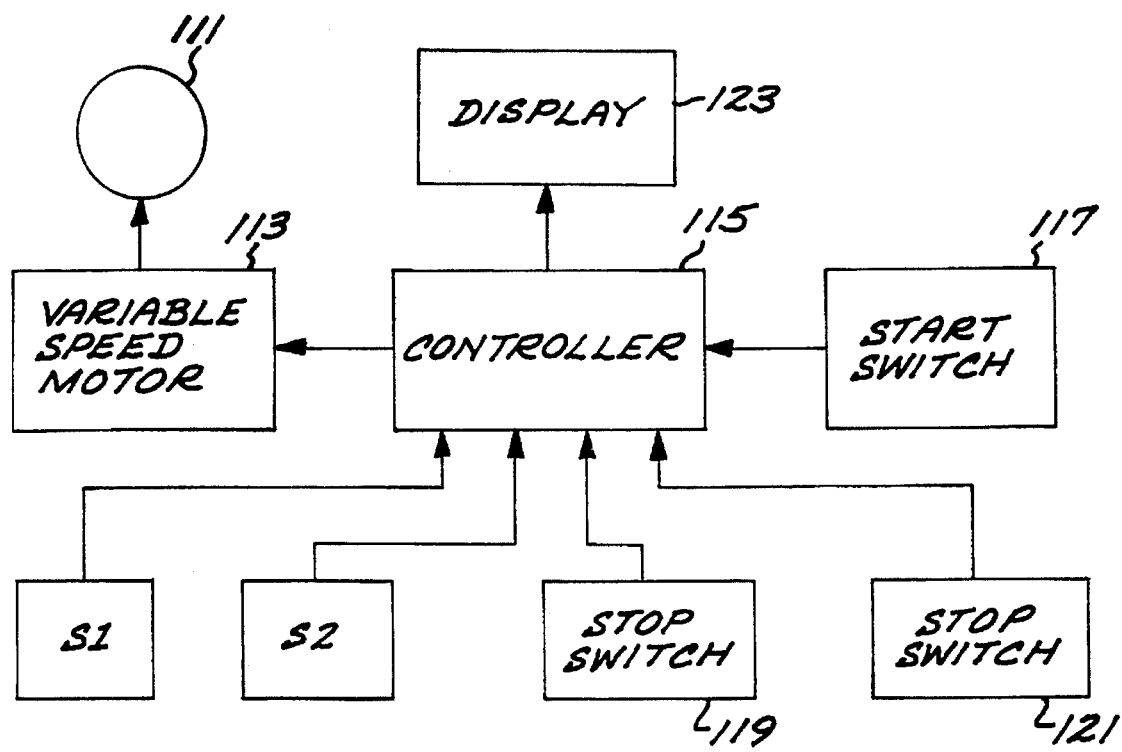
FIG. 7 is a schematic block diagram of a game system in which the hologram structure of the invention is advantageously utilized

Referring now to FIG. 7, set forth therein is a block diagram of a game system in which the hologram structure of the invention is advantageously utilized. The game system a variable speed motor 113 for rotating a segmented image hologram structure 111. The speed of the variable speed motor 113 is controlled by a controller 115 also controls reconstruction beam sources S1, S2 for the particular example of a two-player game system wherein each hologram is viewable from a single eyebox for a particular reconstruction beam. Inputs to the controller 115 are provided by a start switch 117 and stop switches 119, 121. The controller 115 further controls the information displayed by a display 123, which can display the results of the utilizing the game system.

Figure 8:
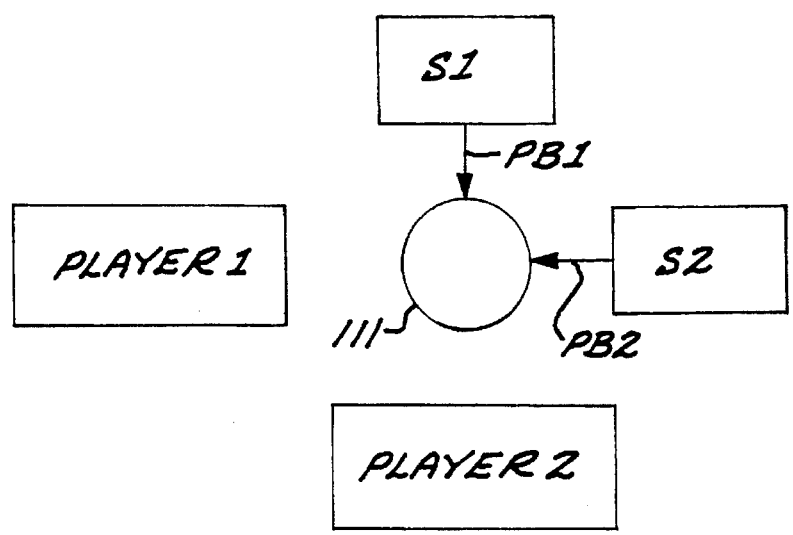
FIG. 8 is schematic top plan view depicting an illustrative example of the relative positions of players and reconstruction sources for the game system of FIG. 7.

By way of illustrative examples, the reconstruction beam sources S1, S2 are installed diametrically across the segmented image hologram structure 111 from corresponding players, as shown in the top plan view of FIG. 8, and provide respective reconstruction beams PB1, PB2 at an angle is downward from horizontal, for example in the range of 30 degrees to 60 degrees down.

In use, rotation of the hologram structure 111 is started by actuation of the start switch 117, and each player views the same images but at slightly different times due to the differently positioned reconstruction sources. Alternatively, each of the holograms in the holographic structure 111 can be recorded to be viewable from two eyeboxes pursuant to reconstruction by a single reconstruction source, in which case both players would see the same images at the same time. The rotational speed of the hologram structure starts at a relatively low level and is increased with time. As the rotational speed of the segmented image hologram increases, the amount of the composite image that is viewable increases, and a player who deduces the contents of the composite image before the entire composite image is viewable actuates an associated stop switch. Depending upon implementation, the first actuation of a stop switch can cause the game to be stopped, for example by stopping the motor or by turning off the reconstruction beam sources, or the game can be continued until each player has actuated an associated stop switch. In the first case, the display indicates the time interval between the start of rotation and the stop button actuation, and in the second case the display indicates the intervals between the start of rotation and the respective stop button actuations.

The foregoing has been a disclosure of a hologram structure that advantageously produces a viewable composite image only when rotating, and can be utilized on rotating elements for a variety of purposes such as advertising, games, and decoration.

Although the foregoing has been a description and illustration of specific embodiments of the invention, various modifications and changes thereto can be made by persons skilled in the art without departing from the scope and spirit of the invention as defined by the following claims.

What is claimed is:

1. A hologram structure comprising:

a plurality of holograms having substantially identical reconstruction characteristics, including an identical reconstruction angle, disposed on a substrate for rotation about a rotation axis, each hologram containing a segment of a composite image that is comprised of the superposition of the segments contained in the holograms and being angularly offset relative to each other such that all segments of the composite image are perceived, as a result of vision persistence, in at least one narrow solid angular region pursuant to rotation of the holograms about the rotation axis at a sufficiently high rate and illumination of the holograms with a reconstruction beam, whereby each segment is independently perceived when the holograms are rotated at a rate that is lower than such sufficiently high rate.

2. The hologram structure of claim 1 wherein said plurality of holograms produce respective segments of respectively assorted colors.

3. The hologram structure of claim 2 wherein two of said segments include an identical subsegment of the composite image whereby one of said two segments contains at least part of the other segment.

4. The hologram structure of claim 1 wherein said plurality of holograms are recorded in respective hologram layers.

5. The hologram structure of claim 4 wherein said respective hologram layers are stacked in laminar fashion.

6. The hologram structure of claim 1 wherein said plurality of holograms are recorded in a single hologram layer.

\* \* \* \* \*